BREAST PADS AND METHOD OF MAKING THE SAME
Filed Feb. 19, 1969 4 Sheets-Sheet 1
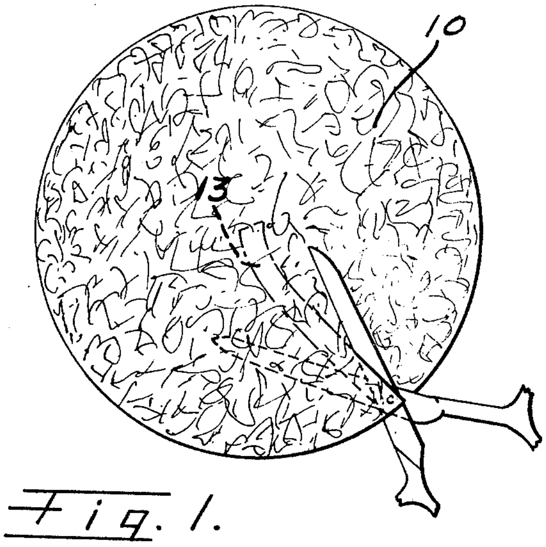
FIG. 1.
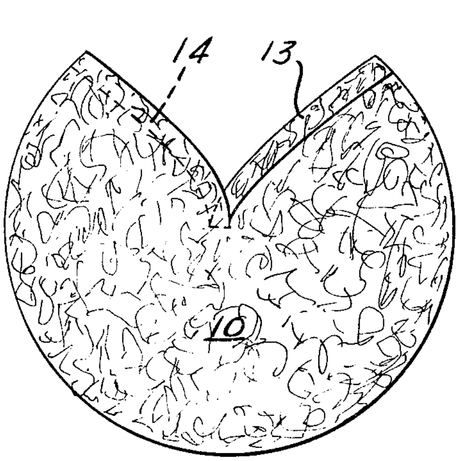
FIG. 2.
FIG. 3.
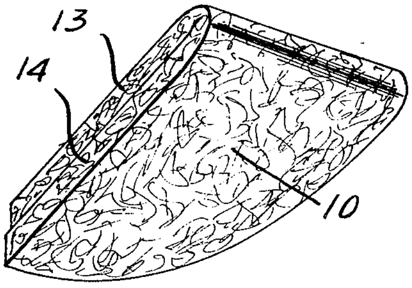
FIG. 4.
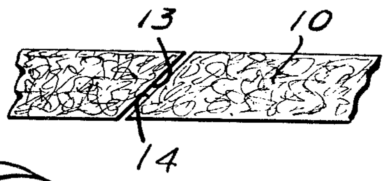
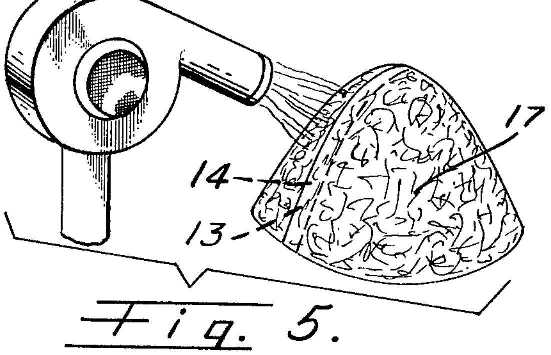
FIG. 5.
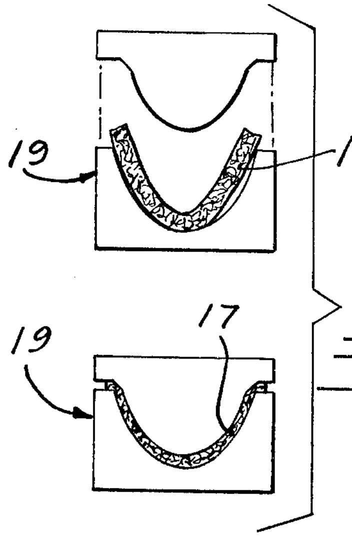
FIG. 6.
INVENTORS
Jack E. Howard,
Lewis A. Kaplan.
by Robert C. Comstock
Attorney

BREAST PADS AND METHOD OF MAKING THE SAME

Filed Feb. 19, 1969 4 Sheets-Sheet 2

INVENTORS,
Jack E. Howard,
Lewis A. Kaplan.
by Robert C. Comstock
Attorney

March 24, 1970 J. E. HOWARD ET AL 3,502,083
BREAST PADS AND METHOD OF MAKING THE SAME
Filed Feb. 19, 1969 4 Sheets-Sheet 3
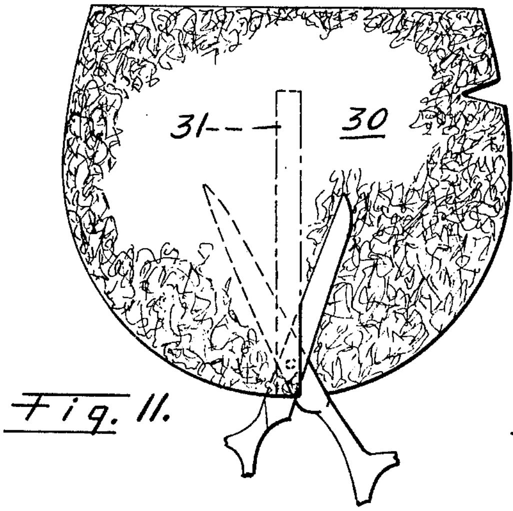
Fig. 11.
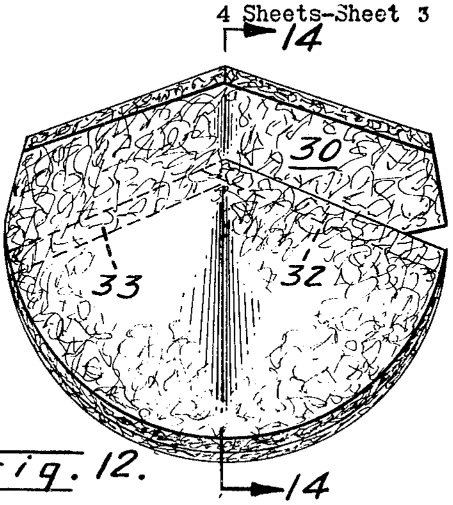
Fig. 12.
Fig. 13.
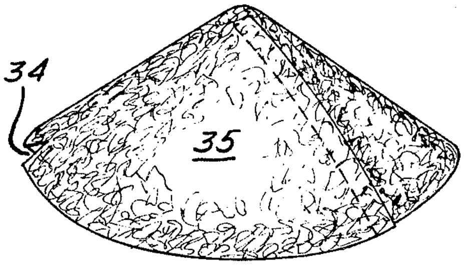
Fig. 14.
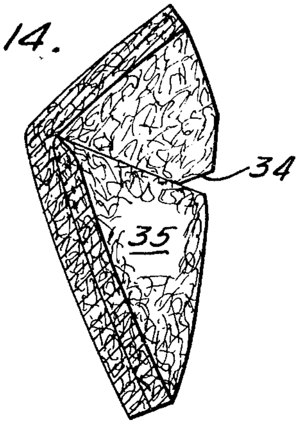
Fig. 15.
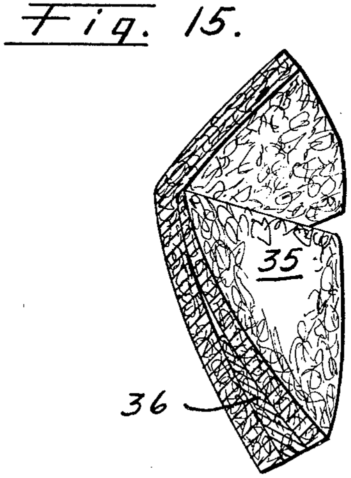
Fig. 16.
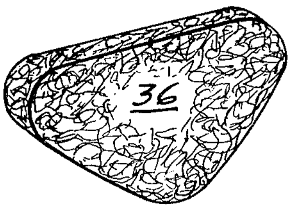
INVENTORS
Jack E. Howard,
Lewis A. Kaplan.
by Robert C. Comstock
Attorney BREAST PADS AND METHOD OF MAKING THE SAME
Filed Feb. 19, 1969 4 Sheets-Sheet 4
Fig. 17.
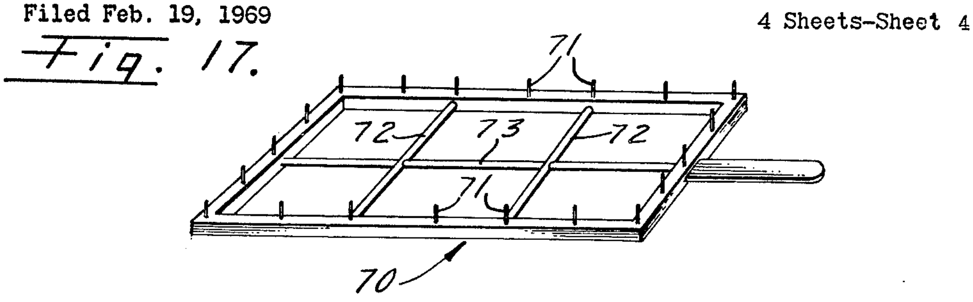
Fig. 18.
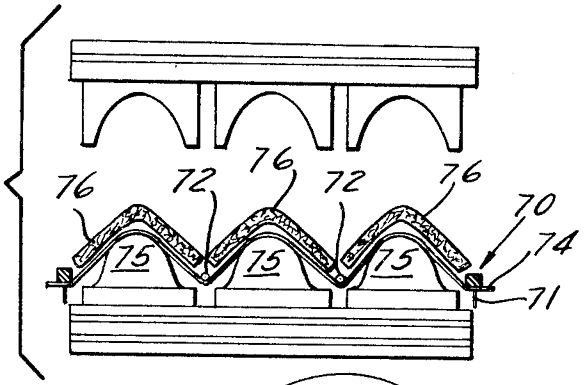
Fig. 19.
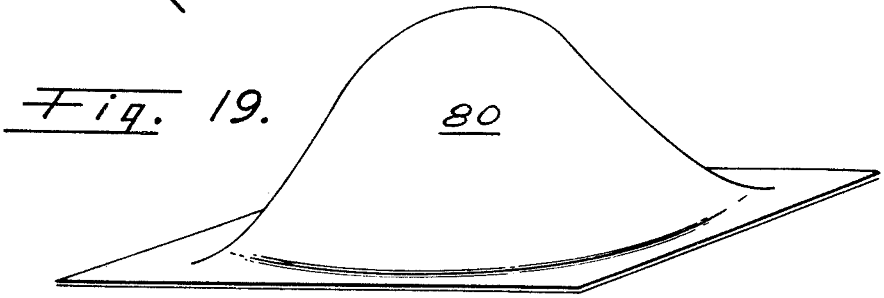
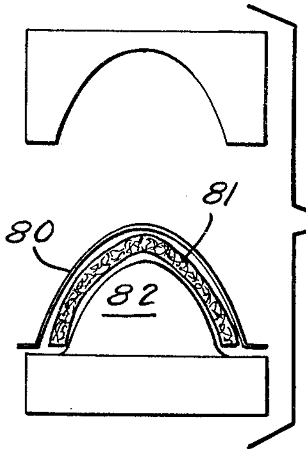
Fig. 20
INVENTORS
Jack E. Howard,
Lewis A. Kaplan.
by Robert C. Comstock
Attorney

United States Patent Office 3,502,083
Patented Mar. 24, 1970

1

3,502,083
BREAST PADS AND METHOD OF MAKING THE SAME

Jack E. Howard and Lewis A. Kaplan, Los Angeles, Calif., assignors to United Cellular Products Corp., Los Angeles, Calif., a corporation of California Continuation-in-part of application Ser. No. 570,519, Aug. 5, 1966. This application Feb. 19, 1969, Ser. No. 800,690
Int. Cl. A41c 3/00
U.S. Cl. 128—516 6 Claims

ABSTRACT OF THE DISCLOSURE

A brassiere pad and method of making the same from flat fiberfill material. A fiberfill blank has at least one cut having a bevelled surface which is coated with adhesive. The blank is twisted into a conical shape and the bevelled surface adhered to another portion of the blank. The conical blank is then molded to provide a brassiere pad having no stitching or tangible seam. The lower portions of the blank may be disposed in overlapping relationship to each other to form push up pads. An inner lining may be bonded to the pads at the same time that they are molded. An outer lining may be separately molded and then bonded to the outside of the pads.

REFERENCE TO RELATED APPLICATION

This application is a continuation-in-part of application Ser. No. 570,519 filed Aug. 5, 1966, now abandoned.

BACKGROUND OF THE INVENTION

Field of the invention

Brassiere pads and more particularly seamless fiberfill breast pads and methods of making the same.

Description of the prior art

Fiberfill breast pads are now formed by sewing the material together, forming an undesirable seam. Pads of the type now in use are also limited in their shapes and structures and require a substantial amount of fabrication time.

SUMMARY OF THE INVENTION

The invention relates to seamless fiberfill breast pads for brassieres and other garments and to methods of making the same. The preferred form of material used is an extremely light fluffy material of the type called fiberfill, which has randomly webbed or garneted synthetic fibers which are held together rather loosely in spaced relationship by acrylic or polyvinyl chloride bonding agents or the like. Such fiberfill materials are customarily furnished by the manufacturer in rolls or batts. Fiberfill is hard to handle and extremely difficult to fabricate, due to its extremely light and loose structure.

It is an object of our invention to provide novel seamless breast pads and method of forming the same from fiberfill material. Another object is to provide such pads which are stronger than the original material from which they are formed.

Still another object of the invention is to provide such pads in which the density of the material is maintained at the apex of the cup and is not thinned out as it is if a pad is drawn or molded from flat material.

It is a further object of the invention to provide fiberfill push-up pads and particularly three-quarter push-up pads in which the lower portion of the pad is substantially thicker than the upper portion, and to provide improved methods of making the same.

2

Another object of the invention is to provide such pads which are lined on the inside and/or outside and to provide improved methods of making the same.

A further object of our invention is to provide breast pads and methods of making the same which are simple and economical and which represent an improvement over the present pads and methods of making the same.

It is among the objects of our invention to provide novel breast pads and methods of making the same having all of the advantages and benefits of the structures and methods set forth above and described in further detail hereinafter in this application.

Our invention also comprises such other objects, advantages and capabilities as will later more fully appear and which are inherently possessed by our invention.

While we have shown in the accompanying drawings preferred embodiments of our invention, it should be understood that the same are susceptible of modification and change without departing from the spirit of our invention.

DESCRIPTION OF THE DRAWINGS

FIG. 1 is a top plan view of a circular blank, showing one of the radial cuts being made by a scissors held at an angle;

FIG. 2 is a top plan view of the blank after radial cuts have been made and the sections between them removed;

FIG. 3 is a perspective view showing the blank folded so that the bevelled edges are adjacent each other for the application of bonding agent;

FIG. 4 is a sectional view showing the bevelled edges formed on one of the cuts;

FIG. 5 is a perspective view showing the application of heat to dry the bonding agent;

FIG. 6 is a diagrammatic sectional view of a two-part mold in open and closed position, with the pad blank in the mold;

FIG. 11 is a top plan view of a goblet-shaped flat blank used to form a three-quarter push up pad, showing a cut being made by a scissors;

FIG. 12 is a top plan view of the inside of the blank of FIG. 11 after it has been twisted into a conical shape;

FIG. 13 is a perspective view of the pad blank shown in FIG. 12;

FIG. 14 is a sectional view of the same taken on line 14—14 of FIG. 12;

FIG. 15 is a similar view of the same with an auxiliary pad inserted between the bottom overlapping layers;

FIG. 16 is a perspective view of the auxiliary pad;

FIG. 17 is a perspective view of the frame used in holding the inner lining fabric;

FIG. 18 is a diagrammatic sectional view of an open two-part mold with the frame, inner lining fabric and pad blanks disposed in overlying relationship to the male mold portions;

FIG. 19 is a perspective view of a piece of fabric molded to conical shape prior to use as an outer lining;

FIG. 20 is a diagrammatic sectional view of an open two-part mold, with the pad and pre-molded outer lining disposed in overlying relationship to the male mold.

DESCRIPTION OF THE PREFERRED EMBODIMENTS

Figure 7:
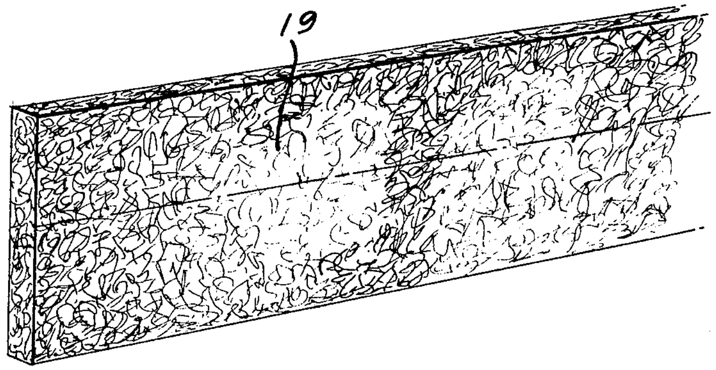
FIG. 7 is a perspective view of a strip of fiberfill material prior to folding the same along the longitudinal axis indicated in phantom lines.
Figure 7A:
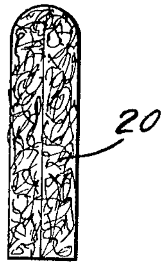
FIG. 7*a* is a sectional view of the double layer formed by folding the strip along its longitudinal axis.
Figure 8:
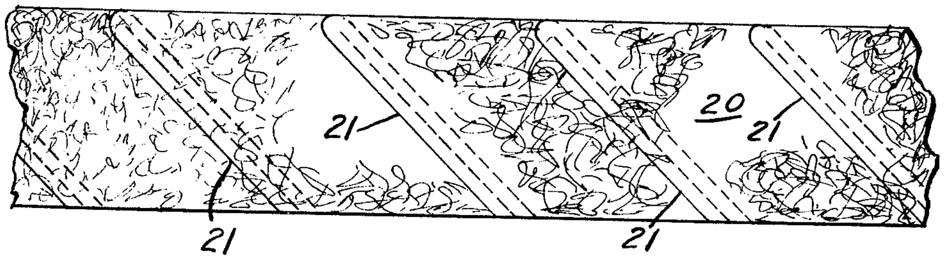
FIG. 8 is a side elevational view of the double layer, showing a series of spaced cuts.

A first preferred embodiment which has been selected to illustrate our invention utilizes material such as randomly webbed or garneted fiberfill or the like. Such material is customarily supplied in rolls or batts, and a desirable thickness for the purpose of our invention is approximately one inch. Such raw material has customarily been lightly sprayed or coated on both side thereof by the manufacturer with a thermoplastic bonding agent which helps to hold the fibers in place. Even so, the material is extremely light, loose and fluffy, being even fluffier than a cotton ball.

A circular blank 10 of fiberfill is cut or otherwise formed from the roll or batt. A pair of radial cuts 13 and 14 are then made in the circular blank 10, such cuts extending continuously from the circumference to the center of the blank. The cuts 13 and 14 are spaced approximately 90 degrees from each other. The blade of the scissors, knife or other sharp cutting instrument which performs the cutting operation is preferably held or disposed at an angle such as from 45° to 60° when the radial cuts 13 and 14 are performed, so that the edges of the cuts are bevelled rather than straight. The quarter section disposed between the cuts 13 and 14 is discarded, leaving the blank 10 as a three-quarter blank. The blank 10 can also be die cut and the edges skived to provide the desired bevelling.

The bevelled edges of the cuts 13 and 14 may then be carded with a wire carding brush. The bevelled edges of the cuts 13 and 14 are then sprayed or otherwise coated with a suitable thermoplastic resin bonding agent such as an acrylic or polyvinyl chloride type. As a specific example, Rohm and Haas Rhoplex E 407 is a suitable material.

As shown in FIG. 3 of the drawings, the blank 10 can be twisted so that the bevelled edges of the cuts 13 and 14 are disposed adjacent to each other in order to facilitate application of the bonding agent.

The bevelled edges of the cuts 13 and 14 are then pressed into engagement with each other. Heat is preferably applied to these areas, as by a blower type heating device as shown in FIG. 5 of the drawings, in order to hasten the drying of the bonding agent.

The edges of the cuts 13 and 14 are thus bonded together to form a conical pad blank 17 which is seamless in that no stitches are used and there is no tangible seam of the type which occurs whenever stitching is used to hold the edges of the material together. The use of bevelled edges on the cuts 13 and 14 provides a substantially large area for adhesion and provides smooth blending without any increase in thickness in the junction area.

The pad blank 17 is then placed in a two-part mold 19 having the shape and contour of the desired finished pad. The blank 17 is then subjected to heat and pressure simultaneously while it is within the mold 19, causing the blank 17 to assume permanently the shape and contour of the mold cavity. The mold 19 may be heated to a temperature such as 300 degrees, and the blank 17 is held within the mold 19 for a period of time such as 30 seconds to 1 minute, with a pressure such as 120 pounds per square inch of mold area.

The molding operation compresses the fiberfill material into the shape and contour desired in the finished pad. The bonding agent of the fiberfill material softens during the molding operation and then hardens when the finished pad is cool in order to hold the fibers together much more securely in the compressed finished pad than in the original loose and fluffy raw material.

The result is a molded brassiere pad which has the desired shape and contour and which is far stronger and more washable than the original material. The molded pad is completely seamless and has any desired uniform or varying cross-sectional thickness, as the design of the cup may require. The molded pad particularly has the unique ability to be as thick or thicker at the apex, a result which is ordinarily impossible to achieve when working from sheet material.

FIGS. 7–10 of the drawings show a method of mechanically cutting blanks from flat fiberfill material and then forming pads from them in the manner described above. An elongated strip 19 of fiberfill material having a width of around six to nine inches is folded along its longitudinal axis to form a U-shaped double layer 20 of raw material. The double layer 20 is then cut as by a band saw, with the blade of the saw directed at an angle. A series of spaced cuts 21 are made in the double layer 20, with the distance between the cuts 21 varying with the size of the pad being formed. The direction of the cuts 21 can be adjusted in accordance with the depth of cone desired in the blanks being formed.

Figure 9:
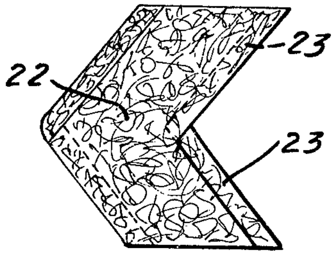
FIG. 9 is a top plan view of one of the blanks formed by the cuts shown in FIG. 8.
Figure 10:
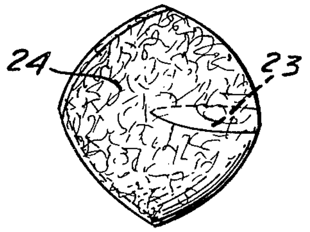
FIG. 10 is a top plan view of a conical pad blank formed by adhering together the bevelled inner edges of the flat blank shown in FIG. 9.

The result is that a plurality of blanks 22 are formed. Each of the blanks 22 is broadly V-shaped, as shown in FIG. 9, and has a pair of bevelled inner edges 23. These edges 23 are sprayed or coated with a bonding agent and adhered to each other in the manner described above in order to form a conical pad blank 24. The pad blank 24 can then be molded in the manner described above.

It will be noted that this type of pad and method are particularly adapted for rapid and economical mass production of pads from raw sheet material.

FIGS. 11–16 of the drawings show a method of forming push up pads, particularly three-quarter size, from flat fiberfill. As shown in FIG. 11 of the drawings, a goblet shaped blank 30 of flat fiberfill material is provided with a vertical cut 31 which extends from the lower circular edge of the blank 30 vertically upwardly to the upper portion of the blank. The blade of the cutting device is held at an angle when the cut 31 is made, to provide a pair of bevelled surfaces 32 and 33. A small guide notch 34 may be cut in the upper right hand edge of the blank 30.

The portions of the blank 30 on opposite sides of the cut 31 are then twisted into overlapping relationship to each other, with the bevelled surface 32 extending from the inner end of the cut 31 to the notch 34 on the inner side of the blank, while the bevelled surface 33 extends in the opposite direction on the outer side of the blank. This twisting operation deforms the blank from a flat to a somewhat conical shape.

The bevelled surfaces 32 and 33 are then adhered to the adjacent portions of the blank 30 through the use of bonding agents in the manner described above. This results in the formation of a seamless roughly conical pad blank 35 as shown in FIG. 13 of the drawings. The twisting causes the upper edge of the blank to change from a straight line to a flat V-shape. The result is that the pad blank 35 which is formed corresponds to that of a three-quarter pad which is designed to cover only three-quarters of the breast.

It will be noted in FIGS. 12 and 14 of the drawings that the entire lower portion of the pad blank 35 comprises a double layer of material, while the upper portion comprises only a single layer of material. The pad blank 35 is then molded in the manner described above to form a three-quarter push up pad.

A triangular auxiliary pad 36 of fiberfill material may be inserted into the pad blank 35 between the bottom two layers of material prior to the molding operation in order to provide additional thickness in the lower portion of the pad. The auxiliary pad 36 is preferably oriented so that its pointed edge is directed downwardly and its flat edge is directed horizontally. As shown in FIG. 15 of the drawings, the auxiliary pad 36 provides additional uplift in the lower part of the pad blank 35 and the finished molded pad.

FIGS. 17–18 of the drawings shown how lining may be applied to the inside of the pads during the same molding process which is used to form the pads. A rectangular pin frame 70 has a plurality of spaced pins 71 extending upwardly from its four edges. The area within the pins 71 is divided by divider rods 72 and 73 into six equal squares.

A piece of fabric 74 is mounted on the pins 71. The fabric used should preferably have enough stretch to be pulled over the male portion of the heated mold and conform to it generally without tearing or becoming thermoplastic at the molding temperature. Acetate tricot with a lot of give in the knit and even cotton jersey with a loose knit could be used. For brassieres, a light acetate tricot is probably the most suitable.

The frame 70, with the pins 71 pointing down, is then placed above the male molds 75 and pressed down so that the fabric 74 is stretched over the male molds 75. The pad blanks 76 are turned inside out and sprayed or coated with a suitable bonding agent or cement. The cement is a two part heat polymerizing type that can be sprayed on the pad blank. Upon heating at 300 degrees Fahrenheit or over for 20–30 seconds, the cement polymerizes and developes much hot strength. Its full physical properties are not developed, however, before 24 hours after molding. The cement should not discolor under heat and it should have excellent washability. The preferred material is a polyurethane base cement.

The pad blanks 76 are then snapped back and one pad blank 76 is placed on top of each of the male molds 75, in overlying relationship to the fabric 74, as shown in FIG. 18 of the drawings. The molds are then closed for the normal heat and time cycle necessary to mold the material and thus the pad is molded and the lining is adhered to it at the same time. Subsequently the pad and lining are trimmed.

FIGS. 19–20 of the drawings show how an outer cover of molded lace, tricot or other suitable material can be applied to the pads. The outer cover material is first separately molded to form a conical outer cover 80. The pad blank 81 is then sprayed lightly on its outer surface, particularly around its edges with a bonding agent of the same type used in applying the inner lining to the pad. The pad blank 81 is then placed over an unheated male mold 82. The mold is then closed and heat of approximately 220° F. is applied to the female mold 83 only. The setting time is approximately 20 seconds, followed by an air cure of approximately 24 hours.

We claim:

1. A method of making breast pads comprising forming a flat blank of fiberfill or the like, said blank being substantially circular in shape, making a pair of radial cuts extending from the circumference of said blank to adjacent the center thereof, each of said cuts having a bevelled surface, carding both of said bevelled surfaces, applying bonding agent to said bevelled surfaces, twisting said blank into a substantially conical shape, pressing said bevelled surfaces together after said bonding agent has been applied, applying heat to said surfaces to dry said bonding agent, and molding said conical blank into a pad having no stitching or tangible seam.

2. A method of making breast pads comprising folding an elongated strip of flat fiberfill along its longitudinal axis to provide a U-shaped double layer, cutting a series of spaced cuts in said double layer to form a plurality of broadly V-shaped blanks having a pair of intersecting inner edges, said inner edges having bevelled surfaces, adhering the bevelled surfaces of each of said blanks to each other, to form a conical blank, and molding said conical blank into a pad having no stitching or tangible seam.

3. A method of making breast pads comprising forming a flat blank of fiberfill or the like, said flat blank being goblet-shaped, making a cut extending from the rounded bottom edge of said blank to the upper portion thereof, twisting the portions of said blank on opposite sides of said cut, so that said portions overlap each other and the edges of said cut extend substantially transversely across the upper portion of said blank, attaching the edges of said cut to the adjacent portions of said blank to form a conical three-quarter push up pad, and molding said conical blank into a pad having no stitching or tangible seam.

4. The method described in claim 3, and inserting between the overlapping lower portions of said pad blank an auxiliary pad of fiberfill material to increase the thickness of the lower part of said pad.

5. A method of making breast pads comprising forming a flat blank of fiberfill or the like, said blank having at least one cut having a bevelled surface, twisting said blank into a substantially conical shape, adhering said bevelled surface to another part of said blank to form a conical blank, fitting a piece of fabric on a rectangular frame divided into a plurality of square sections corresponding in size and position to the cavities of a multiple cavity mold, placing said frame between the parts of a two-part mold so that said fabric is disposed in overlying relationship to the male portions of said mold, coating the inside surface of a plurality of said conical pad blanks with bonding agent, placing said blanks on said male portions in overlying relationship to said fabric and bonding said fabric to said pad blank simultaneously with the molding of said pad blanks into pads.

6. A method of making breast pads comprising forming a flat blank of fiberfill or the like, said blank having at least one cut having a bevelled surface, twisting said blank into a substantially conical shape, adhering said bevelled surface to another part of said blank to form a conical blank, molding a piece of fabric into a conical shape, coating the outside of said pad blank with a bonding agent placing said coated pad blank in overlying relationship to the male portion of a two-part mold, placing said molded fabric in overlying relationship to the coated surface of said pad blank and bonding said fabric to the outside of said pad blank through the application of heat and pressure to said mold, said heat and pressure being applied only to the female portion of said mold.

References Cited

UNITED STATES PATENTS

| | | | |
|---|---|---|---|
| 2,505,458 | 4/1950 | Brauer | 128—481 |
| 2,627,606 | 2/1953 | De Grandis | 128—481 |
| 3,181,536 | 5/1965 | Cannata | 128—481 |
| 3,392,731 | 7/1968 | Silverman | 128—481 |
| 2,507,745 | 5/1950 | Wilkenfeld et al. | 128—481 |

ADELE M. EAGER, Primary Examiner

U.S. Cl. X.R.

117—140; 128—280, 480; 264—324